United States Patent
Farrenkopf

[19]

[11] Patent Number: 6,094,039
[45] Date of Patent: Jul. 25, 2000

[54] SWITCHING CONTROLLER CHIP OPERABLE IN SELECTED ONES OF MULTIPLE POWER SWITCH SETTING MODES

[75] Inventor: Douglas Robert Farrenkopf, Campbell, Calif.

[73] Assignee: National Semiconductor Corporation, Santa Clara, Calif.

[21] Appl. No.: 09/418,906

[22] Filed: Oct. 15, 1999

[51] Int. Cl.[7] .................................................. G05F 1/40
[52] U.S. Cl. ............................................................ 323/283
[58] Field of Search .................................. 323/282, 283, 323/284, 287

[56] References Cited

U.S. PATENT DOCUMENTS

| | | | |
|---|---|---|---|
| 4,823,070 | 4/1989 | Nelson | 323/299 |
| 5,610,503 | 3/1997 | Fogg et al. | 323/283 |

*Primary Examiner*—Shawn Riley
*Attorney, Agent, or Firm*—Limbach & Limbach L.L.P.

[57] ABSTRACT

A switching controller or regulator (implemented as an integrated circuit) which is operable in any selected one of multiple two modes, including an oscillator mode in which it generates switch control signals for turning on a power switch in response to internally generated clock pulses, a sync mode in which it generates the switch control signals in response to pulses supplied from external circuitry, and preferably also a shutdown mode in which it consumes little or no power and does not generate switch control signals. In the oscillator and sync modes, the controller or regulator also generates additional control signals for turning off the power switch each time after it is turned on, so as to regulate the duty cycle of the power switch. Preferably, the controller or regulator chip has only a single external pin for receiving control signals for causing the chip to enter a sequence of the available operating modes, and it includes a level shifter, a sync timer, a shutdown timer, and a controllable oscillator, all connected to such pin. A multiplexer, operating under control of the sync timer, receives the outputs of the level shifter and oscillator, and selects one of these outputs in response to a control signal from the sync timer. Other aspects of the invention are a DC-to-DC converter including a switching controller or regulator chip of the described type and circuitry external to the chip for generating a regulated output potential in response to an input potential, and a method for performing DC-to-DC conversion using any embodiment of the switching controller or regulator chip.

29 Claims, 6 Drawing Sheets

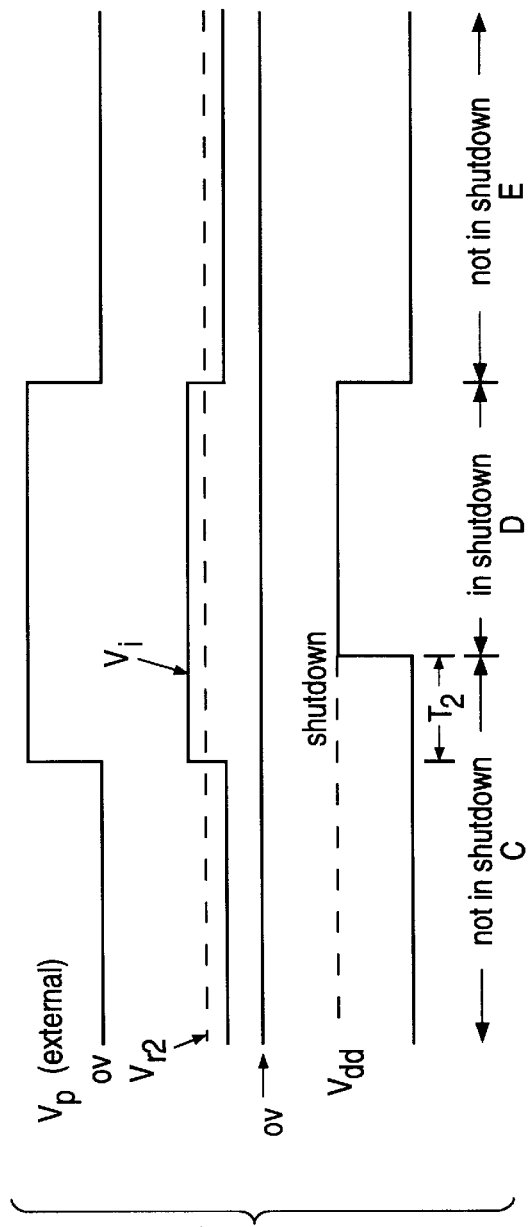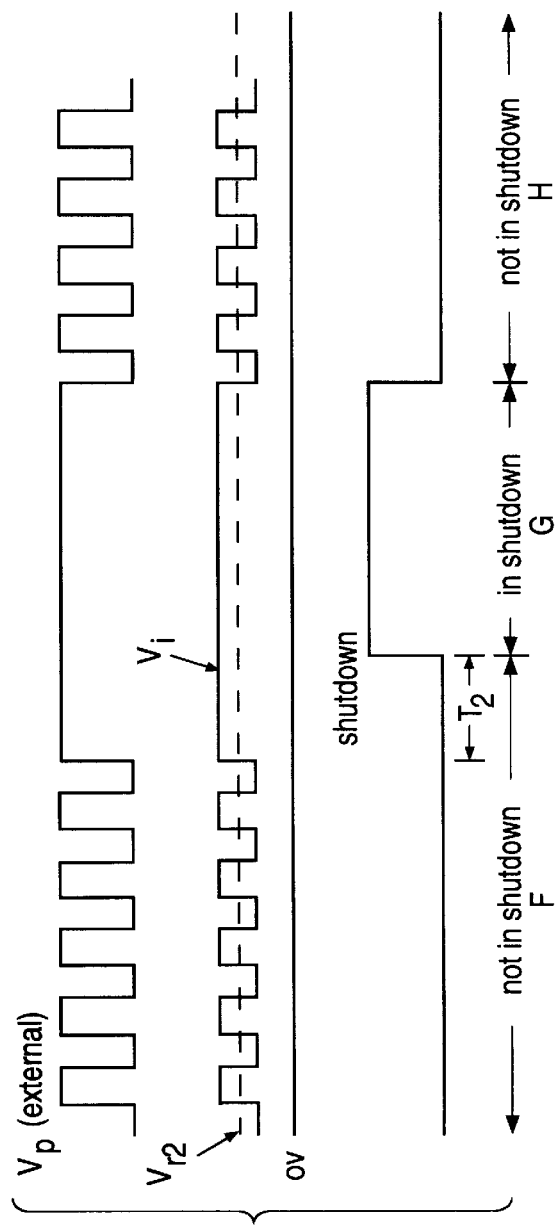

SWITCHING CONTROLLER CHIP OPERABLE IN SELECTED ONES OF MULTIPLE POWER SWITCH SETTING MODES

BACKGROUND OF THE INVENTION

1. Field of the Invention

The present invention relates to switching power supply circuitry. Specifically, the invention relates to a switching controller or regulator (implemented as an integrated circuit) for use in a DC-to-DC converter in which a power switch switches on in response to "on" signals from the controller or regulator chip (and in which the power switch switches off in response to "off" signals from the controller or regulator chip), where the controller or regulator chip is operable in any selected one of at least two modes, including a mode in which the chip generates the "on" signals in response to internally generated clock pulses, and another mode in which the chip generates the "on" signals in response to pulses supplied from external circuitry.

2. Description of the Related Art

FIG. 1 is a conventional DC-to-DC converter which includes current mode switching controller 1 which is implemented as an integrated circuit, and boost converter circuitry external to controller chip 1. The boost converter circuitry comprises NMOS transistor N1 (which functions as a power switch), inductor L, current sense resistor $R_s$, Schottky diode D, capacitor $C_{out}$, feedback resistor divider $R_{F1}$, and $R_{F2}$, compensation resistor $R_c$, and compensation capacitor $C_c$, connected as shown. The FIG. 1 converter produces a regulated DC output voltage $V_{out}$ across load $R_o$, in response to input DC voltage $V_{in}$.

Controller chip 1 includes oscillator 2 (having a first output and a second output), comparator 8, driver 6 which produces an output potential $V_{DR}$ at pad 12 (to which the gate of switch N1 is coupled), latch 4 (having "set" terminal coupled to oscillator 2, "reset" terminal coupled to the output of comparator 8, and an output coupled to the input of driver 6), error amplifier 10 (having a non-inverting input maintained at reference potential $V_{ref}$), and circuit 9 (having a first input coupled to the second output of oscillator 2, a second input coupled to pad 13, and an output coupled to the inverting input of comparator 8).

Pad 13 is at potential $V_c$, which is determined by the output of error amplifier 10 (in turn determined by the difference between the instantaneous potential at Node A and the reference potential $V_{ref}$) and the values of external resistor $R_c$ and capacitor $C_c$. Reference potential $V_{ref}$ is set (in a well known manner) by circuitry within chip 1, and is normally not varied during use of the circuit. In order to set the regulated level of the output voltage $V_{out}$, resistors $R_{F1}$ and $R_{F2}$ with the appropriate resistance ratio $R_{F1}/R_{F2}$ are employed.

Oscillator 2 asserts a clock pulse train (having fixed frequency and waveform as indicated) at its first output, and each positive-going leading pulse edge of this pulse train sets latch 4. Each time latch 4 is set, a control signal asserted by driver 6 (the potential $V_{DR}$ asserted by driver 6 to the gate of transistor N1) causes transistor N1 to turn on, which in turn causes current $I_L$ from the source of N1 to increase in ramped fashion. Although transistor N1 turns on at times in phase with the periodic clock pulse train, it turns off at times (which depend on the relation between reference potential $R_{ref}$ and the instantaneous potential at Node A) that have phase that is independent relative to that of the pulses of the periodic clock pulse train.

Oscillator 2 asserts ramped voltage $V_{osc}$ (which periodically increases at a fixed ramp rate and then decreases with a waveform as indicated) at its second output. Circuit 9 asserts the potential $V_c-V_{osc}$ to the inverting input of comparator 8. Assertion of the potential $V_c-V_{osc}$ (rather than $V_c$) to comparator 8 is necessary for stability.

The non-inverting input of comparator 8 is at the feedback potential $V_s=I_L R_s$, which increases in ramped fashion in response to each "set" of latch 4 by oscillator 2. When $V_s=V_c-V_{osc}$ (after latch 4 has been set), the output of comparator 8 resets latch 4, which in turn causes the potential $V_{DR}$ asserted by driver 6 to the gate of transistor N1 to turn off transistor N1. Thus, by the described use of both signals output from oscillator 2 and feedback asserted to error amplifier 10 from Node A, controller chip 1 switches transistor N1 on and off with timing that regulates the output potential $V_{out}$ of the FIG. 1 circuit.

Other conventional DC-to-DC converters which include a current mode switching controller implemented as an integrated circuit (as does the FIG. 1 circuit) also include circuitry (e.g., buck converter circuitry) other than boost converter circuitry that is external to the controller chip. Typical buck controller circuitry differs from the boost converter circuitry of FIG. 1 in that it includes an NMOS transistor (replacing NMOS transistor N1 of FIG. 1) whose source is coupled through an inductor to the output node (whereas in FIG. 1 the drain of transistor N1 is coupled through diode D to the output node, and inductor L is coupled between the input potential $V_{in}$ and the source of N1), a Schottky diode connected between ground and the source of N1 (replacing diode D of FIG. 1), a sense resistor connected between the input potential $V_{in}$ and the drain of the transistor (rather than between ground and the source of N1 as in FIG. 1), and a boost capacitor coupled between the controller chip and the source of the transistor.

We shall use the expression "switching regulator" chip herein to denote a circuit which performs the functions of a "switching controller" chip but which also includes an on-board power switch. In contrast, a "switching controller" chip does not include an on-board power switch and must be used with an external power switch (as controller chip 1 of FIG. 1 is used with an NMOS transistor N1 which is external to chip 1). Switching controller chip 1 of FIG. 1 is an example of a "current mode" switching controller chip. There are other types of switching controller and regulator chips (such as voltage mode switching controllers) which can be implemented in accordance with the invention, some of which work without an external sense resistor while others require an external sense resistor.

Some conventional DC-to-DC converters differ from the conventional circuit of FIG. 1 in that they include a current mode switching regulator chip in place of a current mode switching controller chip. The current mode switching regulator chip in each such converter does not include a sense resistor, and instead is used with an external sense resistor (such as resistor $R_s$ of FIG. 1). For example, one such converter employs a current mode switching regulator chip that differs from chip 1 of FIG. 1 in that counterparts to NMOS transistor N1 and resistors $R_{F1}$ and $R_{F2}$ are implemented on-board the regulator chip. In this type of converter, the circuitry external to the regulator chip does not include an external power switch, but it does include an external sense resistor (e.g., an external sense resistor identical to resistor $R_s$ of FIG. 1).

It would be desirable to implement improved versions of conventional switching regulator (or controller) chips, in which the improved controller or regulator chip is operable in any selected one of at least two modes, including an oscillator mode in which the improved chip generates switch control signals (for turning on a power switch) in response to internally generated clock pulses, and a sync mode in which the chip generates the switch control signals in response to pulses supplied from external circuitry. For example, the pulses supplied from external circuitry could occur periodically at a user-specified frequency, or they could be indicative of a user-specified synchronization waveform. It would also be desirable for such an improved controller or regulator chip to enter a shutdown mode (in which it consumes little or no power, and does not generate switch control signals) in response to an externally supplied control signal. However, until the present invention it had not been known how to implement such an improved controller (regulator) chip so that only a single external pin is required to send control signals to the chip to cause it to enter either of the oscillator and sync modes (or any of the oscillator, sync, and shutdown modes).

SUMMARY OF THE INVENTION

In a class of embodiments, the invention is a switching controller or regulator (e.g., a current mode switching controller or regulator) implemented as an integrated circuit which is operable in any selected one of at least two modes, including an oscillator mode in which it generates switch control signals (for turning on a power switch) in response to internally generated clock pulses, and a sync mode in which it generates the switch control signals in response to pulses supplied from external circuitry. In each of the oscillator and sync modes, the controller (or regulator) also generates additional switch control signals for turning off the power switch (which is typically an NMOS transistor) each time after it is turned on, so as to regulate the duty cycle of the power switch. In preferred embodiments, the controller (or regulator) chip is operable (in response to externally supplied control signals) in any selected one of three modes: a shutdown mode (in which it consumes little or no power, and does not generate switch control signals); an oscillator mode (of the mentioned type); and a sync mode (of the mentioned type).

Preferably the controller (or regulator) chip is implemented to have only a single external pin for receiving the control signals which cause the chip to enter any of its operating modes (e.g., the oscillator and sync modes, or the oscillator, sync, and shutdown modes), and each sequence of control signals which cause the chip to enter a sequence of the available operating modes. In preferred embodiments, the inventive controller (regulator) chip includes a level shifter, a sync timer, a shutdown timer, and a controllable oscillator, all connected in parallel with the external control pin. A multiplexer (operating under control of the sync timer) receives the outputs of the level shifter and controllable oscillator, so that either of these outputs can be passed through the multiplexer in response to a control signal from the sync timer. In some embodiments, the controllable oscillator asserts a clock pulse train whose frequency is determined by the value of an external resistor coupled to the chip's external control pin.

Another aspect of the invention is a DC-to-DC converter which includes a switching controller or regulator chip of any of the types mentioned in the previous paragraph, and circuitry (typically including a current sense resistor) external to the controller or regulator chip for generating a regulated DC output potential in response to a DC input potential.

The invention is especially useful where it is impractical or undesirable to implement a controller (or regulator) chip with more than a single pin dedicated for connection to both external mode control circuitry and external circuitry for supplying power switch setting pulses.

For convenience, the expression "switching controller" integrated circuit (or chip) is used in the claims to denote an integrated circuit in the broad class of integrated circuits consisting of both switching regulators (each including an on-board power switch) and switching controllers (which do not include on-board power switches, but are used with external power switches to perform the same functions performed by current mode switching regulators). The invention pertains both to current mode switching controller chips and other switching controller chips (such as voltage mode switching controller chips), and to switching controller chips which work without external sense resistors as well as switching controller chips which require external sense resistors.

Another aspect of the invention is a method for performing DC-to-DC conversion using any embodiment of the inventive switching controller (or regulator) chip and external circuitry coupled to the controller (or regulator) chip. The method includes the step of asserting control signals to a single pin of the controller (or regulator) chip to cause the chip to operate in a sequence of selected ones of at least two modes, including an oscillator mode in which the controller (or regulator) chip generates switch control signals (for turning on a power switch) in response to internally generated clock pulses, a sync mode in which the controller (or regulator) chip generates the switch control signals in response to pulses supplied from external circuitry, and preferably also a shutdown mode in which the controller (or regulator) chip consumes little or no power, and does not generate switch control signals.

BRIEF DESCRIPTION OF THE DRAWINGS

FIG. 4 is a set of waveforms generated by (and supplied to) controller chip 102 of FIG. 2 during transitions from the oscillator mode to the shutdown mode and from the shutdown mode to the oscillator mode.

FIG. 5 is a set of waveforms generated by (and supplied to) controller chip 102 of FIG. 2 during transitions from the sync mode to the shutdown mode and from the shutdown mode to the sync mode.

DETAILED DESCRIPTION OF THE PREFERRED EMBODIMENTS

A preferred embodiment of the inventive current mode switching controller (implemented as an integrated circuit)

will be described with reference to FIG. 2 (and the waveforms shown in FIGS. 3–5). Then, a variation on controller chip 102 of FIG. 2 will be described with reference to FIG. 6, and a DC-to-DC converter which includes another variation on controller chip 102 of FIG. 2 will be described with reference to FIG. 7.

Figure 1:
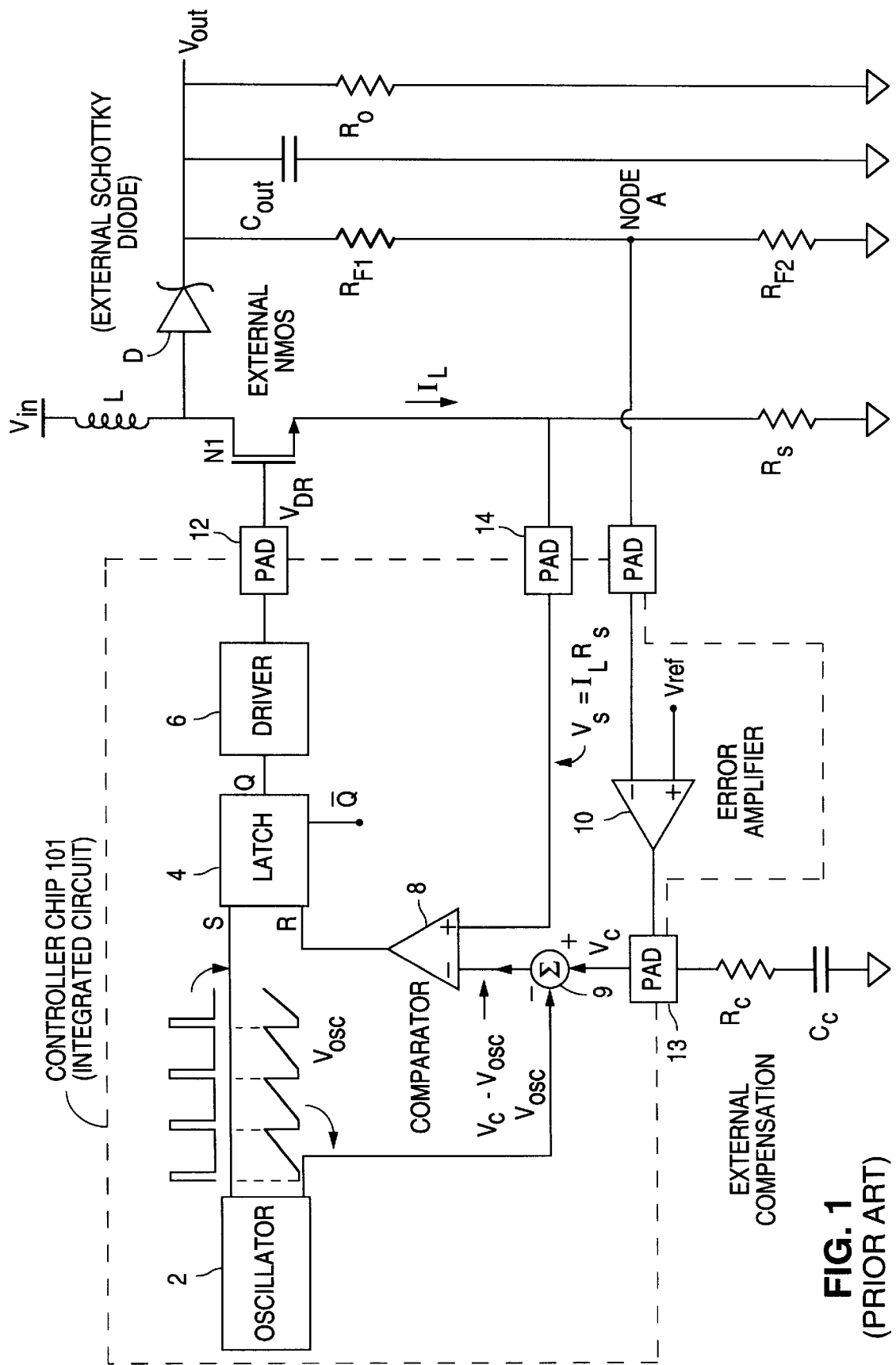
FIG. 1 is a schematic diagram of a conventional DC-to-DC converter including external boost controller circuitry, but including no soft start circuitry.
Figure 2:
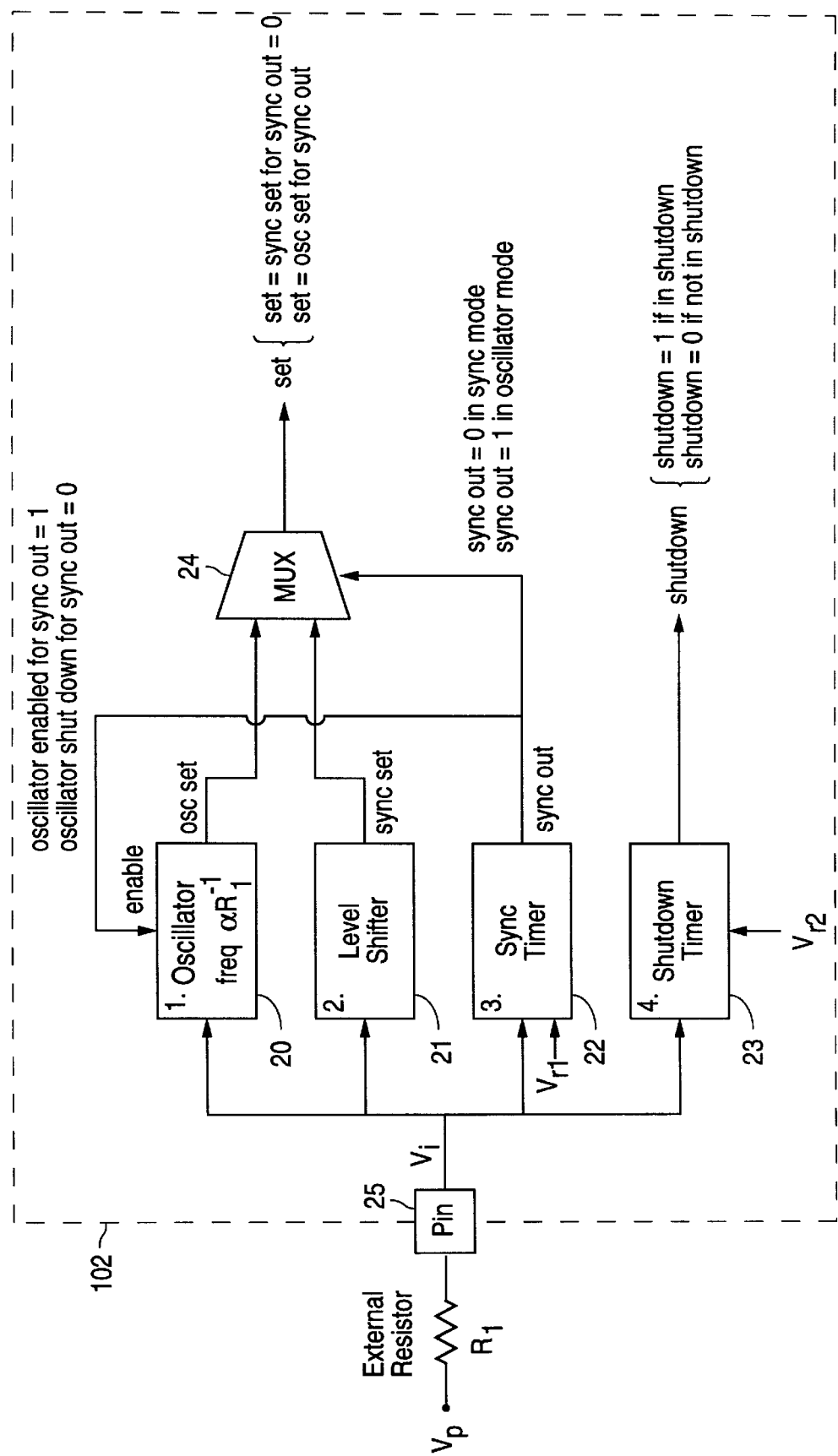
FIG. 2 is a block diagram of elements of a preferred embodiment of a current mode switching controller designed in accordance with the present invention.

Controller chip 102 of FIG. 2 is identical to controller chip 101 of FIG. 1, except in that it includes oscillator 20 (which replaces oscillator 2 of FIG. 1) and includes the following elements that are not present in chip 101: external pin 25, level shifter 21, sync timer 22, shutdown timer 23, and multiplexer 24, connected as shown in FIG. 2.

Current mode switching controller chip 102 asserts, at the output of multiplexer 24, "set pulses" (for a latch such as latch 4 of FIG. 1) either in response to signals generated (at a frequency specified by an external signal received at pin 25) by internal oscillator 20, or signals (generated by level shifter 21) which are replicas of an externally generated synchronization waveform received at pin 25. Chip 102 is also configured to enter a shutdown mode in response to an externally generated shutdown control signal received at pin 25.

Thus, in response to signals received at single external pin 25, controller chip 102 enters any of the following three operating modes:

1. an "oscillator mode," in which "set pulses" are generated by oscillator 20. Oscillator 20 is configured to assert at its output a clock pulse train having frequency F, where F is proportional to the inverse of the resistance of external resistor $R_1$ (which is coupled to pin 25) when external potential $V_p$ is ground potential. The pulses of this clock pulse train are the "set pulses," which are used for periodically setting latch 4 (shown in FIG. 1) so as to trigger the periodic switching on of a power switch. In the oscillator mode, multiplexer 24 is controlled (in response to a control bit from sync timer 22) to pass through the set pulses from oscillator 20 to the "set" terminal of latch 4;

2. a "sync" mode, in which level shifter 21 generates "set pulses" by translating the levels of externally generated pulses that are asserted to pin 25 (to CMOS logic levels, for example), so that the set pulses output from level shifter 21 are replicas of the externally generated pulses; and 3. a "shutdown" mode, in which controller 102 powers down and is put in a state in which it does not assert control signals to a power switch (for turning the power switch off and on) and draws no more than a very small bias current on the order of 10 $\mu$A.

With reference to FIG. 2, $V_p$ is an external voltage which is applied to pin 25 of controller chip 102 through external resistor $R_1$.

Pin 25 is at potential $V_i$.

The output of sync timer 22 is a control signal (labeled "sync out" in FIG. 2) indicative of a logical 1 if $V_i$, the potential at a first input of timer 22, is less than reference potential $V_{r1}$ (asserted to the other input of timer 22) for a time longer than $T_1$. Otherwise, the output of sync timer 22 is a control signal indicative of a logical 0. Oscillator 20 is enabled when the output of sync timer 22 indicates a logical 1, and is disabled when the output of sync timer 22 indicates a logical 0. Also, the output of sync timer 22 is asserted to multiplexer 24. Multiplexer 24 selects the output of oscillator 20 (labeled "osc set" in FIG. 2) when the output of sync timer 22 indicates a logical 1, and multiplexer 24 selects the output of level shifter 21 (labeled "sync set" in FIG. 2) when the output of sync timer 22 indicates a logical 0.

When enabled, oscillator 20 asserts at its output a clock pulse train having the same waveform as that of the clock pulse train output by oscillator 2 (of FIG. 1), and having frequency F. The frequency F is proportional to the inverse of the resistance of external resistor $R_1$ (which is coupled to pin 25) when external potential $V_p$ is ground potential. By coupling a resistor $R_1$ having appropriate resistance to pin 25, the frequency F of oscillator 20's output pulse train is set. When oscillator 20 is enabled, multiplexer 24 selects the output of oscillator 20 (labeled "osc set" in FIG. 2), and passes "osc set" through (i.e., to the set terminal of latch 4) to trigger the periodic switching on of the power switch.

When oscillator 20 is disabled, multiplexer 24 selects the output of level shifter 21 (labeled "sync set" in FIG. 2), and passes "sync set" through (i.e., to the set terminal of latch 4) to trigger the periodic switching on of the power switch. This "sync" mode operation occurs when $V_i$, the potential at pin 25, exceeds reference potential $V_{r1}$ at least once during each elapsed time $T_1$. Typically, external potential $V_p$ is asserted with a square wave waveform (and with frequency greater than $1/T_1$), so that pin 25 is at a potential $V_i$ varying with the same square wave waveform and frequency, to cause controller 102 to enter the "sync" mode. In the "sync" mode, level shifter 21 translates the levels of this square wave potential $V_i$ to CMOS logic levels (to generate "sync set" with a square wave waveform at the output of level shifter 21). Such a square wave "isync set" signal is passed through multiplexer 24, and periodically sets latch 4 (shown in FIG. 1) so as to trigger the periodic switching on of the power switch.

The output of shutdown timer 23 is a control signal (labeled "shutdown" in FIG. 2) that is indicative of a logical 1 if $V_i$, the potential at a first input of timer 23, is greater than reference potential $V_{r2}$ (asserted to the other input of timer 23) for a time longer than $T_2$. Otherwise, the output of shutdown timer 23 is a control signal indicative of a logical 0. Chip 102 responds to the "shutdown" signal indicating a logical 1 by entering the shutdown mode, in which it powers down (so it draws no more than a very small bias current, typically on the order of 10 $\mu$A) and is in a state in which it does not assert control signals to switch on the power switch. When the "shutdown" signal indicates a logical 0, chip 102 operates in one of the described "oscillator" and "sync" modes.

Figure 3:
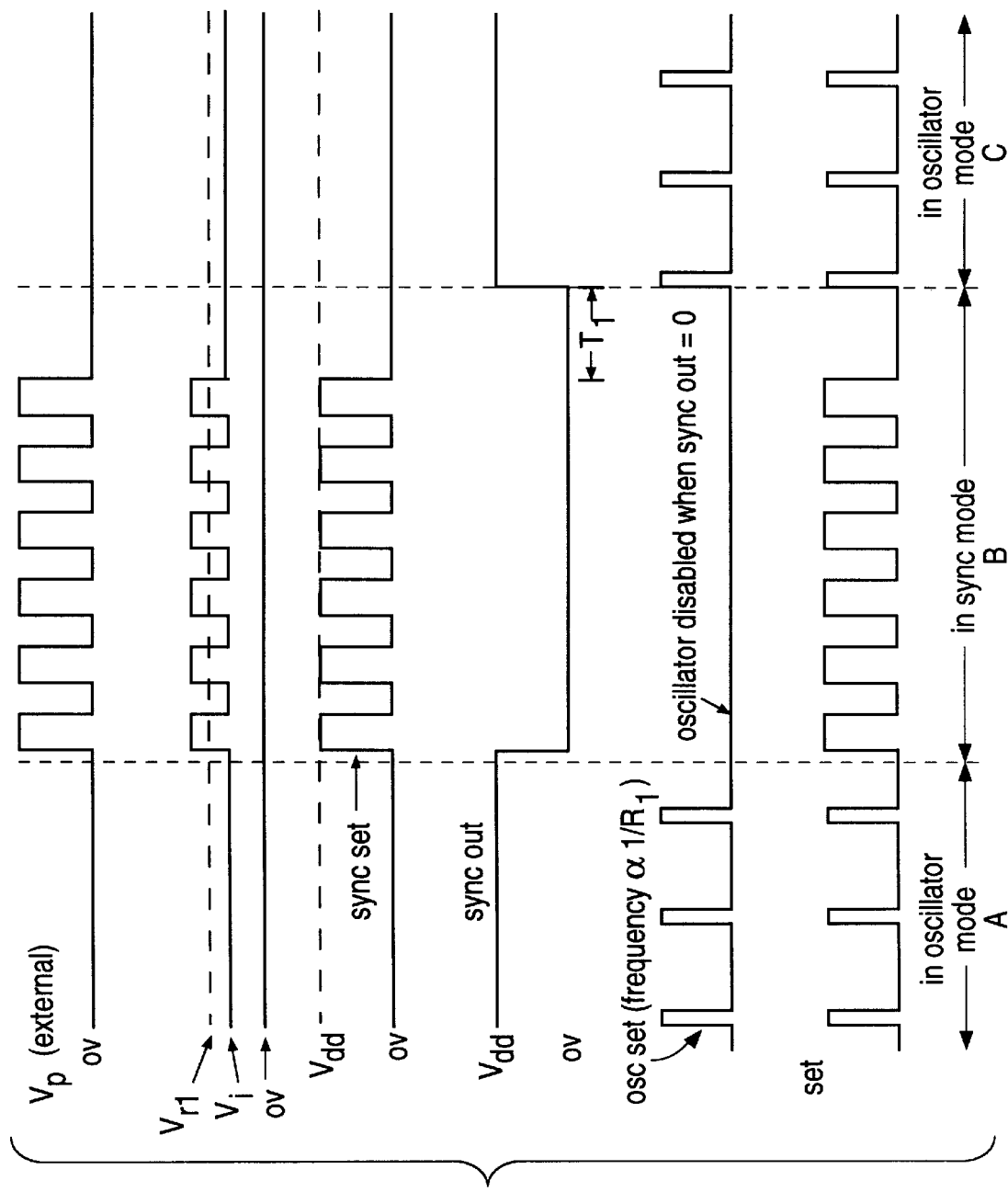
FIG. 3 is a set of waveforms generated by (and supplied to) controller chip 102 of FIG. 2 in typical operation (other than in a shutdown mode).

FIG. 3 is a set of waveforms generated by (and supplied to) controller chip 102 in typical operation of controller chip 102. FIG. 3 shows $V_p$ at ground potential (zero volts) during an initial period "A" and a final period "C," and $V_p$ varying as a square wave during intermediate period "B."

It is assumed that during periods A and C, $V_i$ (the potential at pin 25) has been less than reference potential $V_{r1}$ for a time longer than $T_1$. Thus, controller chip 102 is in the oscillator mode during periods A and C. In this mode, control signal "sync out" (asserted by sync timer 22) is at supply potential $V_{dd}$ above ground and is thus indicative of a logical 1. Thus, the signal "set" output from multiplexer 24 is the clock pulse train "osc set" output from oscillator 20. The clock pulse train "osc set" has a frequency F which is proportional to $1/R_1$.

During period B, each of $V_p$ (the external potential) and $V_i$ (the potential at pin 25) is a square wave, and $V_i$ exceeds reference potential $Vr_1$ for some portion of each elapsed time $T_1$. Thus, controller chip 102 is in the sync mode during period B. In this mode, control signal "sync out" (asserted by sync timer 22) is at ground potential and is thus indicative of a logical 0. Thus, the signal "set" that is output from multiplexer 24 is a replica of $V_p$ (with the "set" signal having been translated by level shifter 21 so as to have peak to peak amplitude $V_{dd}$, rather than the peak to peak amplitude of $V_p$. It will be apparent that sync timer 22 must be implemented so that the time $T_1$ is longer than the maximum time that potentials $V_i$ and $V_p$ remain low (i.e., at ground potential), without $V_i$ rising above potential $V_{r1}$, during controller chip 102's sync mode.

FIG. 4 is a set of waveforms generated by (and supplied to) controller chip 102 during transitions from the oscillator mode to the shutdown mode and from the shutdown mode to the oscillator mode. FIG. 4 shows $V_p$ at ground potential (zero volts) during an initial period "C" and a final period "E," and $V_p$ at a high potential during intermediate period "D." FIG. 4 assumes that during periods C and E, $V_i$ (the potential at pin 25) has been less than reference potential $V_{r1}$ for a time longer than $T_1$, and that $V_i$ is less than reference potential $V_{r2}$. Thus, controller chip 102 is in the oscillator mode during periods C and E.

At a time $T_2$ prior to the start of period D (still with reference to FIG. 4), $V_p$ increases to a potential that is sufficiently high to cause potential $V_i$ to exceed the reference potential $V_{r2}$. Thus, at the start of period D, the level of the "shutdown" signal (asserted at the output of shutdown timer 23) increases so that the "shutdown" signal becomes indicative of a logical 1. At the end of period D, $V_p$ decreases to a potential sufficiently low to cause potential $V_i$ to fall below reference potential $V_{r2}$, so that the "shutdown" signal becomes indicative of a logical 0. As a result, controller chip 102 operates in the shutdown mode during period D.

FIG. 5 is a set of waveforms generated by (and supplied to) controller chip 102 of FIG. 2 during transitions from the sync mode to the shutdown mode and from the shutdown mode to the sync mode. FIG. 5 shows that $V_p$ oscillates (as a square wave) between ground potential (zero volts) and a high potential during an initial period "F" and a final period "H." and that $V_p$ remains at the high potential during intermediate period "G." In response, $V_i$ (the potential at pin 25) also oscillates as a square wave during periods "F" and "H," and $V_i$ remains at a high potential during period "G." FIG. 5 assumes that during periods F and H, $V_i$ exceeds reference potential $V_{r1}$ for at least part of each elapsed time $T_1$, and that $V_i$ falls below reference potential $V_{r2}$ for at least part of each elapsed time $T_2$. Thus, controller chip 102 is in the sync mode during periods F and H. Shutdown timer 23 is implemented so that time $T_2$ is longer than the period (inverse frequency) with which $V_p$ oscillates (during controller 102's oscillator mode).

At a time $T_2$ prior to the start of period G (still with reference to FIG. 5), $V_p$ ceases oscillating and remains at its high level, which is a potential sufficiently high to cause potential $V_i$ to exceed the reference potential $V_{r2}$. Thus, at the start of period G, the level of the "shutdown" signal (asserted at the output of shutdown timer 23) increases so that the "shutdown" signal becomes indicative of a logical 1. At the end of period G, $V_p$ again oscillates, so that potential $V_i$ falls below reference potential $V_{r2}$ for at least part of each elapsed time $T_2$, and the "shutdown" signal becomes indicative of a logical 0. As a result, controller chip 102 operates in the shutdown mode during period G.

Figure 6:
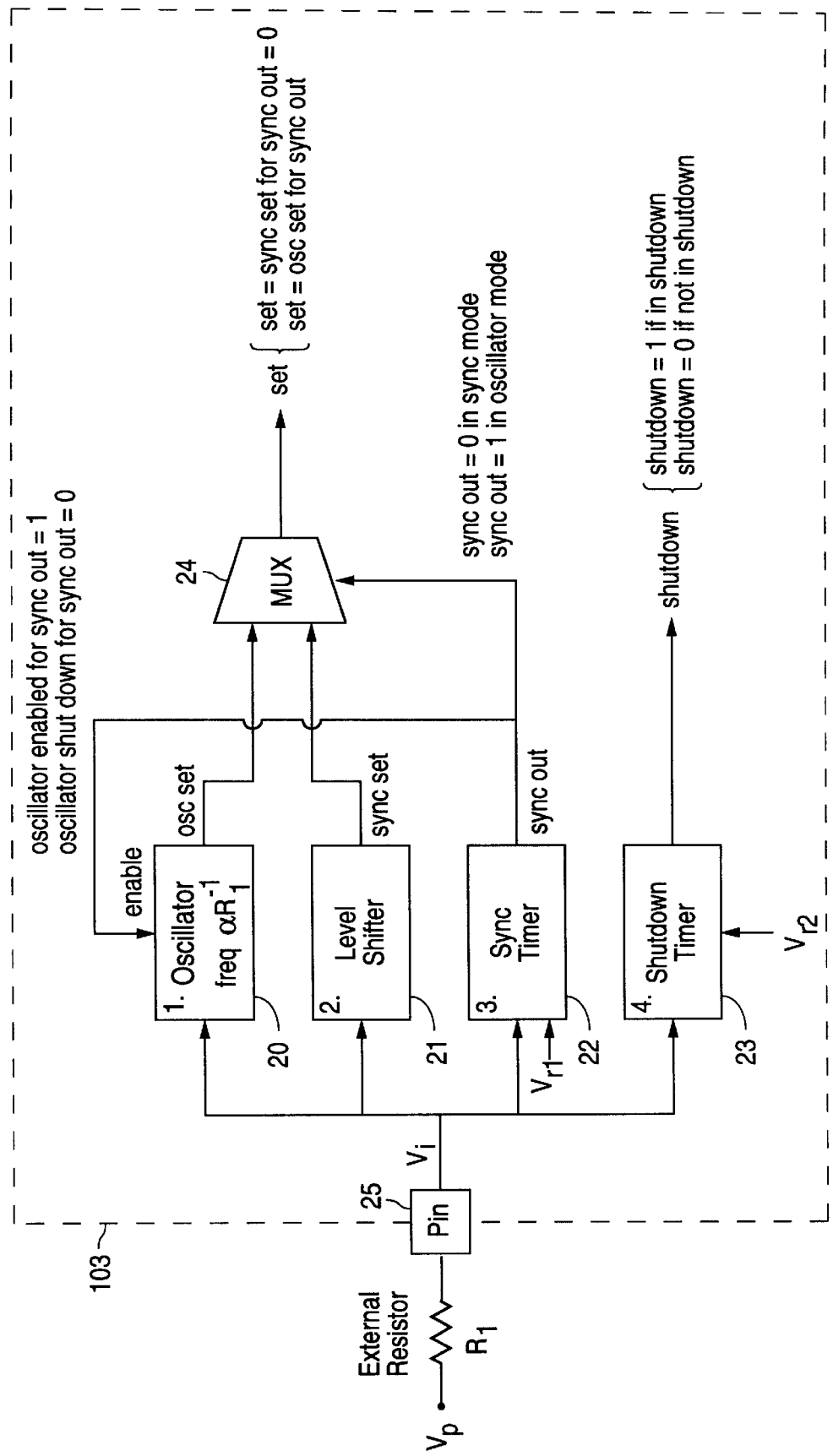
FIG. 6 is a schematic diagram of a DC-to-DC converter which includes a regulator chip (regulator chip 103) designed in accordance with the present invention.

FIG. 6 is a diagram of current mode switching regulator chip 103, which is a variation on controller 102 of FIG. 2. Regulator chip 103 includes an internal power switch (not shown) whereas controller chip 102 is used with an external power switch, but regulator chip 103 generates the same control signals for turning the power switch off and on as does chip 102. Regulator chip 103 includes the same circuitry (elements 20, 21, 22, 23, 24, and 25) shown in FIG. 2, and operates in oscillator, sync, and shutdown modes in the same way as does controller chip 102. In both controller chip 102 and regulator chip 103, a feedback loop is used to turn off the power switch, thus regulating the output voltage of the overall DC-to-DC converter which includes the chip.

Figure 7:
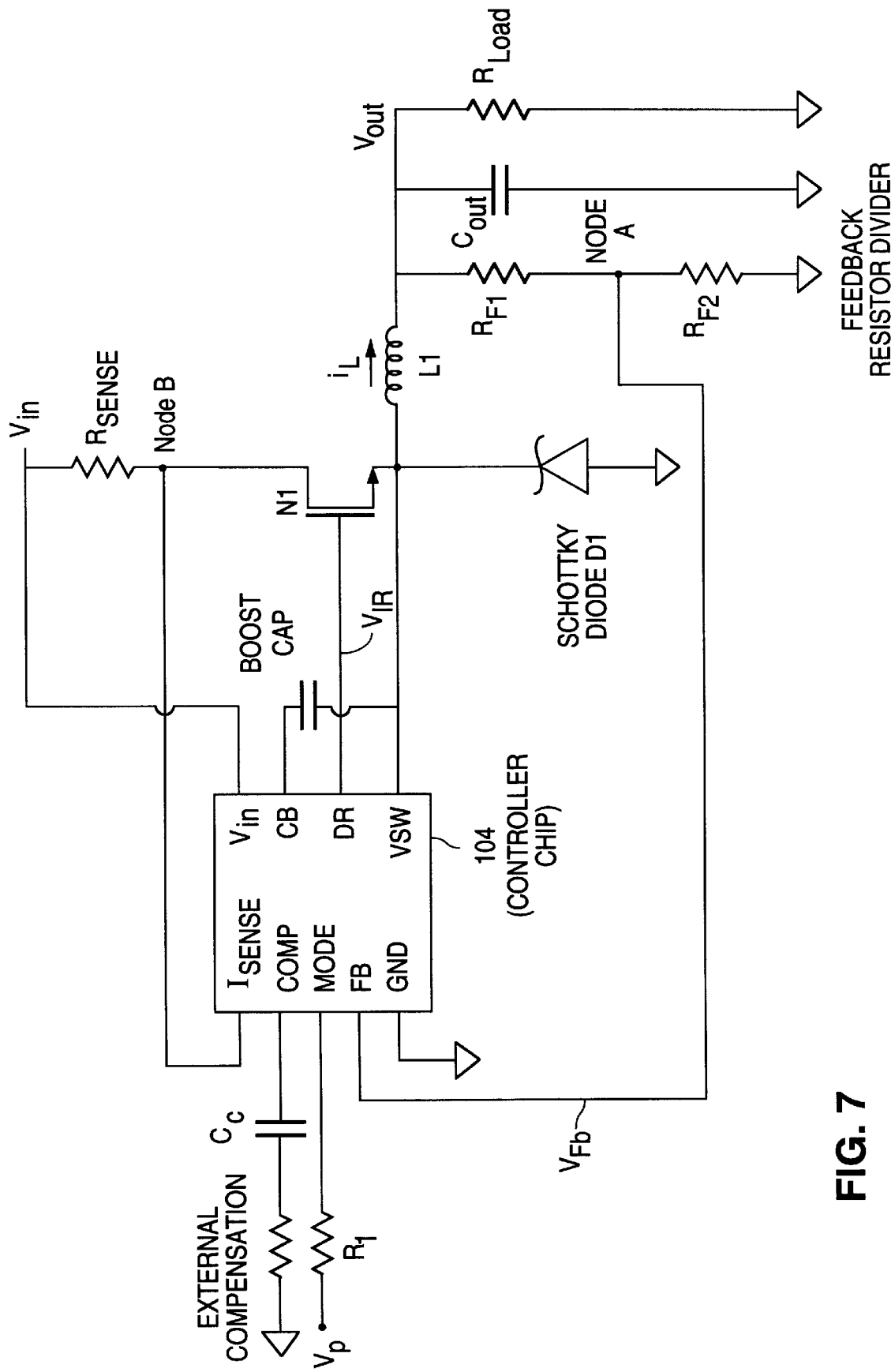
FIG. 7 is a schematic diagram of a DC-to-DC converter which includes a controller chip (controller chip 104) designed in accordance with the present invention.

Next, with reference to FIG. 7, we describe a DC-to-DC converter which includes controller chip 104, and buck controller circuitry external to chip 104. Controller chip 104 of FIG. 7 is identical to controller chip 102 of FIG. 2, except in minor respects apparent to those of ordinary skill in the art (including in that it has a pin coupled to boost capacitor $C_B$) required for it to control external buck controller circuitry rather than external boost controller circuitry. The buck controller circuitry of FIG. 7 differs from the boost converter circuitry of FIG. 1 in that the source of NMOS transistor N1 is coupled through inductor L1 to the output node (whereas in FIG. 1 the drain of transistor N1 is coupled through diode D to the output node, and inductor L is coupled between the input potential $V_i$, and the source of N1), Schottky diode D1 is connected between ground and the source of N1 (replacing diode D of FIG. 1), sense resistor $R_{sense}$ is connected between the input potential $V_{in}$ and the drain of N1 (rather than between ground and the source of N1 as in FIG. 1), and boost capacitor $C_B$ is coupled between chip 101 and the source of transistor N1.

Controller chip 104 includes elements 20, 21, 22, 23, and 24 of FIG. 2 (which are connected as shown in FIG. 2, but are not shown in FIG. 7 for simplicity), with the pin labeled "Mode" in FIG. 7 corresponding to pin 25 of FIG. 2. Chip 104 differs from chip 102 of FIG. 2 only in minor respects apparent to those of ordinary skill in the art (including in that it has a pin coupled to boost capacitor $C_B$). Chip 104 of FIG. 7 functions in essentially the same manner as does chip 102 of FIG. 2, including by turning on transistor N1 by setting a latch (i.e., latch 4 of FIG. 1) in response to pulses from multiplexer 24 and turning off transistor N1 by resetting the latch in response to a comparison of $V_c$–$V_{osc}$ (where $V_{osc}$ is a ramped voltage produced by an oscillator and $V_c$ is the potential at the pin labeled "FB") with a feedback potential indicative of the potential $V_s$ at Node B (between resistor $R_{sense}$ and the drain of N1). After latch 4 within chip 104 has been set, the latch 4 resets (causing driver 6 within chip 104 to assert a potential $V_{DR}$ to the gate of transistor N1 which turns off transistor N1) when $V_s = V_c - V_{osc}$.

In alternative embodiments, the invention is a DC-to-DC converter which includes a current mode switching controller chip (which embodies the invention, and is capable of entering any of multiple operating modes in response to signals asserted to a single pin thereof) and external circuitry (e.g., boost controller circuitry) other than the buck controller circuitry of FIG. 7.

In other embodiments, the invention is a DC-to-DC converter which includes a current mode switching regulator chip rather than a current mode switching controller chip (with "current mode switching regulator" denoting a circuit which performs all functions of a "current mode switching controller" but which also includes an on-board power switch, in contrast with a "current mode switching controller" chip, which does not include an on-board power switch and must be used with an external power switch), and in which the power switch is implemented on-board the regulator chip (rather than as an external power switch). For example, one such embodiment is a variation on that of FIG. 7, in which current mode switching controller chip 104 is replaced by current mode switching regulator chip which includes all elements of chip 104 and also an integrated circuit implementation of NMOS transistor N1 (which functions as a power switch).

Although only a number of preferred embodiments have been described in detail herein, those having ordinary skill in the art will certainly understand that many modifications are possible without departing from the teachings hereof. All such modifications are intended to be encompassed within the following claims.

What is claimed is:

1. A DC-to-DC converter for producing a regulated output potential in response to an input potential, said DC-to-DC converter comprising:

a switching controller implemented as an integrated circuit and having multiple operating modes including an oscillator mode and a sync mode, wherein the controller includes first circuitry configured to assert switch control signals for switching on a power switch during each of at least two of the operating modes, wherein the controller includes second circuitry configured to assert additional switch control signals in response to at least one feedback potential, wherein the power switch switches off in response to the additional switch control signals, wherein the controller includes an external control pin, and wherein the first circuitry in the oscillator mode generates the switch control signals in response to internally generated clock pulses, and the first circuitry in the sync mode generates the switch control signals in response to switch control pulses asserted to the control pin; and external circuitry, coupled to the controller and configured to generate and assert to the controller the at least one feedback potential, wherein one of the controller and the external circuitry includes the power switch, wherein the external circuitry is coupled to the control pin and configured to assert mode control signals to said control pin to cause the controller to operate in a sequence of the operating modes, and to assert the switch control pulses to the control pin when the controller operates in the sync mode.

2. The converter of claim 1, wherein the mode control signals include an oscillator mode control signal for causing the controller to operate in the oscillator mode, and a sync mode control signal for causing the controller to operate in the sync mode, wherein the oscillator mode control signal is a potential, $V_i$, asserted to the control pin, where the potential $V_i$ is less than a first reference potential for a time interval of duration $T_1$, wherein the first reference potential is generated internally to the controller, and wherein the sync mode control signal is the potential $V_i$ asserted to the control pin such that said potential $V_i$ exceeds the first reference potential at least once during each elapsed period of time having the duration $T_1$.

3. The converter of claim 1, wherein the operating modes also include a shutdown mode, in which the controller does not generate the switch control signals, and wherein the external circuitry is configured to assert a shutdown control signal to the control pin to cause the controller to operate in the shutdown mode.

4. The converter of claim 3, wherein the mode control signals include an oscillator mode control signal for causing the controller to operate in the oscillator mode, a sync mode control signal for causing the controller to operate in the sync mode, and a shutdown signal for causing the controller to operate in the shutdown mode, wherein the oscillator mode control signal is a potential, $V_i$, asserted to the control pin, where the potential $V_i$ is less than a first reference potential for a time interval of duration $T_1$, wherein the sync mode control signal is the potential $V_i$ asserted to the control pin such that said potential $V_i$ exceeds the first reference potential at least once during each elapsed period of time having the duration $T_1$, and the shutdown signal is the potential $V_i$ asserted to the control pin such that said potential $V_i$ is greater than a second reference potential for a time interval of duration $T_2$, and wherein the controller is configured to internally generate each of the first reference potential and the second reference potential.

5. The converter of claim 1, wherein the mode control signals include an oscillator mode control signal for causing the controller to operate in the oscillator mode, and a sync mode control signal for causing the controller to operate in the sync mode, and wherein the controller includes:

a sync timer having an output, a first input coupled to the control pin, and a second input coupled to receive a first reference potential, wherein the sync timer asserts a control signal at its output when the controller operates in the oscillator mode and a second control signal at its output when the controller operates in the sync mode;

a level shifter having an input coupled to the control pin and an output, wherein the level shifter is configured to assert level shifted pulses at its output in response to the switch control pulses, when said switch control pulses are asserted to the control pin;

an oscillator coupled to the sync timer and having an output, wherein the oscillator is enabled in response to the control signal from the sync timer and disabled in response to the second control signal from the sync timer, and wherein the oscillator asserts a clock pulse train at its output when enabled; and a multiplexer coupled to the sync timer, wherein the multiplexer has a first input coupled to the output of the level shifter, a second input coupled to the output of the oscillator, and a multiplexer output, wherein the multiplexer is configured to pass through the clock pulse train from the first input to the multiplexer output in response to the control signal from the sync timer, the multiplexer is configured to pass through the level shifted pulses from the first input to the multiplexer output in response to the second control signal from the sync timer, whereby pulses of the clock pulse train are the switch control signals in the oscillator mode and the level shifted pulses are the switch control signals in the sync mode.

6. The converter of claim 5, wherein the oscillator mode control signal is a potential $V_i$ asserted to the control pin, where the potential $V_i$ is less than the first reference potential for a time interval of duration $T_1$, and the sync mode control signal is the potential $V_i$ asserted to the control pin such that said potential $V_i$ exceeds the first reference potential at least once during each elapsed period of time having the duration $T_1$.

7. The converter of claim 6, wherein the sync mode control signal is said potential $V_i$ asserted to the control pin as a stream of pulses that occur with a switch set frequency greater than $1/T_1$, each of the pulses defining a transition from a relatively low potential less than the first reference potential to a relatively high potential greater than the first reference potential, and wherein the level shifter is configured to respond to said stream of pulses at the control pin by asserting the level shifted pulses as a level shifted pulse train having said switch set frequency.

8. The converter of claim 7, wherein the level shifted pulses have CMOS logic levels.

9. The converter of claim 5, wherein the mode control signals also include a shutdown signal for causing the controller to operate in the shutdown mode, and wherein the controller also includes:

a shutdown timer having a first input coupled to the control pin, and a second input coupled to receive a second reference potential, wherein the oscillator mode control signal is a potential, $V_i$, asserted to the control pin, where the potential $V_i$ is less than the first reference potential for a time interval of duration $T_1$, the sync mode control signal is the potential $V_i$ asserted to the control pin such that said potential $V_i$ exceeds the first reference potential at least once during each elapsed period of time having the duration $T_1$, the shutdown signal is the potential $V_i$ asserted to the control pin such that said potential $V_i$ is greater than the second reference potential for a time interval of duration $T_2$.

10. The converter of claim 5, wherein the external circuitry includes a resistor coupled to the control pin and having a resistance, the oscillator is a controllable oscillator having an input coupled to the control pin, and the controllable oscillator is configured to assert the clock pulse train such that pulses of the clock pulse train occur at a frequency determined by the resistance of the resistor.

11. The converter of claim 10, wherein the oscillator mode control signal is a potential $V_i$ asserted to the control pin, where the potential $V_i$ is less than the first reference potential for a time interval of duration $T_1$, and the sync mode control signal is the potential $V_i$ asserted to the control pin such that said potential $V_i$ exceeds the first reference potential at least once during each elapsed period of time having the duration $T_1$.

12. The converter of claim 10, wherein the switching controller is a current mode switching controller.

13. A switching controller implemented as an integrated circuit having multiple operating modes including an oscillator mode and a sync mode, the controller being suitable for use in a DC-to-DC converter for producing a regulated output potential in response to an input potential, wherein the DC-to-DC converter is formed by coupling external circuitry to the controller such that one of the controller and the external circuitry includes a power switch, the external circuitry is configured to assert to the controller at least one feedback potential, the external circuitry is configured to assert mode control signals to the controller to cause said controller to operate in a sequence of the operating modes, and the external circuitry is configured to assert switch control pulses to the controller when the controller operates in the sync mode, said controller comprising:

first circuitry configured to assert switch control signals for switching on the power switch during each of at least two of the operating modes;

second circuitry configured to assert additional switch control signals in response to at least one feedback potential, to cause the power switch to switch off in response to the additional switch control signals;

an external control pin coupled for receiving the mode control signals and the switch control pulses, and asserting said mode control signals and said switch control pulses to the first circuitry, wherein the first circuitry is configured to operate in the oscillator mode to generate the switch control signals in response to internally generated clock pulses, and the first circuitry is configured to operate in the sync mode to generate the switch control signals in response to the switch control pulses.

14. The controller of claim 13, wherein the mode control signals include an oscillator mode control signal and a sync mode control signal, wherein the first circuitry is configured to cause the controller to operate in the oscillator mode in response to receiving the oscillator mode control signal at the control pin, the first circuitry is configured to cause the controller to operate in the sync mode in response to receiving the sync mode control signal at the control pin, and the first circuitry is coupled to receive a first reference potential, wherein the oscillator mode control signal is a potential, $V_i$, asserted to the control pin such that the potential $V_i$ is less than the first reference potential for a time interval of duration $T_1$, and wherein the sync mode control signal is the potential $V_i$ asserted to the control pin such that said potential $V_i$ exceeds the first reference potential at least once during each elapsed period of time having the duration $T_1$.

15. The controller of claim 13, wherein the operating modes also include a shutdown mode in which the controller does not generate the switch control signals, and wherein the first circuitry of the controller is configured to operate in the shutdown mode in response to receiving a shutdown control signal at the control pin.

16. The controller of claim 15, wherein the mode control signals include an oscillator mode control signal, a sync mode control signal, and a shutdown signal, wherein the first circuitry is configured to cause the controller to operate in the oscillator mode in response to receiving the oscillator mode control signal at the control pin, the first circuitry is configured to cause the controller to operate in the sync mode in response to receiving the sync mode control signal at the control pin, the first circuitry is configured to cause the controller to operate in the shutdown mode in response to receiving the shutdown signal at the control pin, and the first circuitry is coupled to receive a first reference potential and a second reference potential, wherein the oscillator mode control signal is a potential, $V_i$, asserted to the control pin, where the potential $V_i$ is less than the first reference potential for a time interval of duration $T_1$, wherein the sync mode control signal is the potential $V_i$ asserted to the control pin such that said potential $V_i$ exceeds the first reference potential at least once during each elapsed period of time having the duration $T_1$, and the shutdown signal is the potential $V_i$ asserted to the control pin such that said potential $V_i$ is greater than the second reference potential for a time interval of duration $T_2$.

17. The controller of claim 13, wherein the mode control signals include an oscillator mode control signal and a sync mode control signal, wherein the first circuitry is configured to cause the controller to operate in the oscillator mode in response to receiving the oscillator mode control signal at the control pin, and the first circuitry is configured to cause the controller to operate in the sync mode in response to receiving the sync mode control signal at the control pin, wherein the controller includes:

a sync timer having an output, a first input coupled to the control pin, and a second input coupled to receive a first reference potential, wherein the sync timer asserts a control signal at its output when the controller operates in the oscillator mode and a second control signal at its output when the controller operates in the sync mode;

a level shifter having an input coupled to the control pin and an output, wherein the level shifter is configured to assert level shifted pulses at its output in response to the switch control pulses, when said switch control pulses are asserted to the control pin;

an oscillator coupled to the sync timer and having an output, wherein the oscillator is enabled in response to the control signal from the sync timer and disabled in response to the second control signal from the sync timer, and wherein the oscillator asserts a clock pulse train at its output when enabled; and a multiplexer coupled to the sync timer, wherein the multiplexer has a first input coupled to the output of the level shifter, a second input coupled to the output of the oscillator, and a multiplexer output, wherein the multiplexer is configured to pass through the clock pulse train from the first input to the multiplexer output in response to the control signal from the sync timer, the multiplexer is configured to pass through the level shifted pulses from the first input to the multiplexer output in response to the second control signal from the sync timer, whereby pulses of the clock pulse train are the switch control signals in the oscillator mode and the level shifted pulses are the switch control signals in the sync mode.

18. The controller of claim 17, wherein the oscillator mode control signal is a potential $V_i$ asserted to the control pin, where the potential $V_i$ is less than the first reference potential for a time interval of duration $T_1$, and the sync mode control signal is the potential $V_i$ asserted to the control pin such that said potential $V_i$ exceeds the first reference potential at least once during each elapsed period of time having the duration $T_1$.

19. The controller of claim 18, wherein the sync mode control signal is said potential $V_i$ asserted to the control pin as a stream of pulses that occur with a switch set frequency greater than $1/T_1$, each of the pulses defining a transition from a relatively low potential less than the first reference potential to a relatively high potential greater than the first reference potential, and wherein the level shifter is configured to respond to said stream of pulses at the control pin by asserting the level shifted pulses as a level shifted pulse train having said switch set frequency.

20. The controller of claim 19, wherein the level shifted pulses have CMOS logic levels.

21. The controller of claim 17, wherein the mode control signals also include a shutdown signal, the controller is configured to operate in the shutdown mode in response to receiving the shutdown signal at the control pin, and wherein the controller also includes:

a shutdown timer having a first input coupled to the control pin, and a second input coupled to receive a second reference potential, wherein the oscillator mode control signal is a potential, $V_i$, asserted to the control pin, where the potential $V_i$ is less than the first reference potential for a time interval of duration $T_1$, the sync mode control signal is the potential $V_i$ asserted to the control pin such that said potential $V_i$ exceeds the first reference potential at least once during each elapsed period of time having the duration $T_1$, the shutdown signal is the potential $V_i$ asserted to the control pin such that said potential $V_i$ is greater than the second reference potential for a time interval of duration $T_2$.

22. The controller of claim 17, wherein the control pin is for connection to a resistor of the external circuitry, said resistor having a resistance, the oscillator is a controllable oscillator having an input coupled to the control pin, and the controllable oscillator is configured to assert the clock pulse train such that pulses of the clock pulse train occur at a frequency determined by the resistance of the resistor.

23. The controller of claim 22, wherein the oscillator mode control signal is a potential $V_i$ asserted to the control pin, where the potential $V_i$ is less than the first reference potential for a time interval of duration $T_1$, and the sync mode control signal is the potential $V_i$ asserted to the control pin such that said potential $V_i$ exceeds the first reference potential at least once during each elapsed period of time having the duration $T_1$.

24. The controller of claim 13, wherein the switching controller is a current mode switching controller.

25. A method for performing DC-to-DC conversion using a switcing controller implemented as an integrated circuit and external circuitry coupled to the controller, wherein the controller is configured to operate in any selected one of multiple operating modes, the controller is configured to produce switch control signals for switching on a power switch in each of at least two of the operating modes, and the controller has an external control pin, said method including the steps of:

(a) asserting control signals to the control pin to cause the controller to operate in a sequence of the operating modes, including an oscillator mode in which the controller generates the switch control signals in response to internally generated clock pulses, and a sync mode in which the controller generates the switch control signals in response to pulses supplied to the control pin from the external circuitry.

26. The method of claim 25, wherein step (a) includes the steps of:

asserting an oscillator mode control signal to the control pin to cause the controller to operate in the oscillator mode; and asserting a sync mode control signal to the control pin to cause the controller to operate in the sync mode.

27. The method of claim 26, wherein the oscillator mode control signal is a potential, $V_i$, asserted to the control pin, where the potential $V_i$ is less than a first reference potential for a time interval of duration $T_1$, wherein the first reference potential is generated internally to the controller, and wherein the sync mode control signal is the potential $V_i$ asserted to the control pin such that said potential $V_i$ exceeds the first reference potential at least once during each elapsed period of time having the duration $T_1$.

28. The method of claim 26, wherein step (a) also includes the step of:

asserting a shutdown control signal to the control pin to cause the controller to operate in a shutdown mode in which the controller does not generate said switch control signals.

29. The method of claim 27, wherein the oscillator mode control signal is a potential, $V_i$, asserted to the control pin, where the potential $V_i$ is less than a first reference potential for a time interval of duration $T_1$, wherein the sync mode control signal is the potential $V_i$ asserted to the control pin such that said potential $V_i$ exceeds the first reference potential at least once during each elapsed period of time having the duration $T_1$, and the shutdown signal is the potential $V_i$ asserted to the control pin such that said potential $V_i$ is greater than a second reference potential for a time interval of duration $T_2$, wherein each of the first reference potential and the second reference potential is generated internally to the controller.

* * * * *